Patented Nov. 14, 1922.

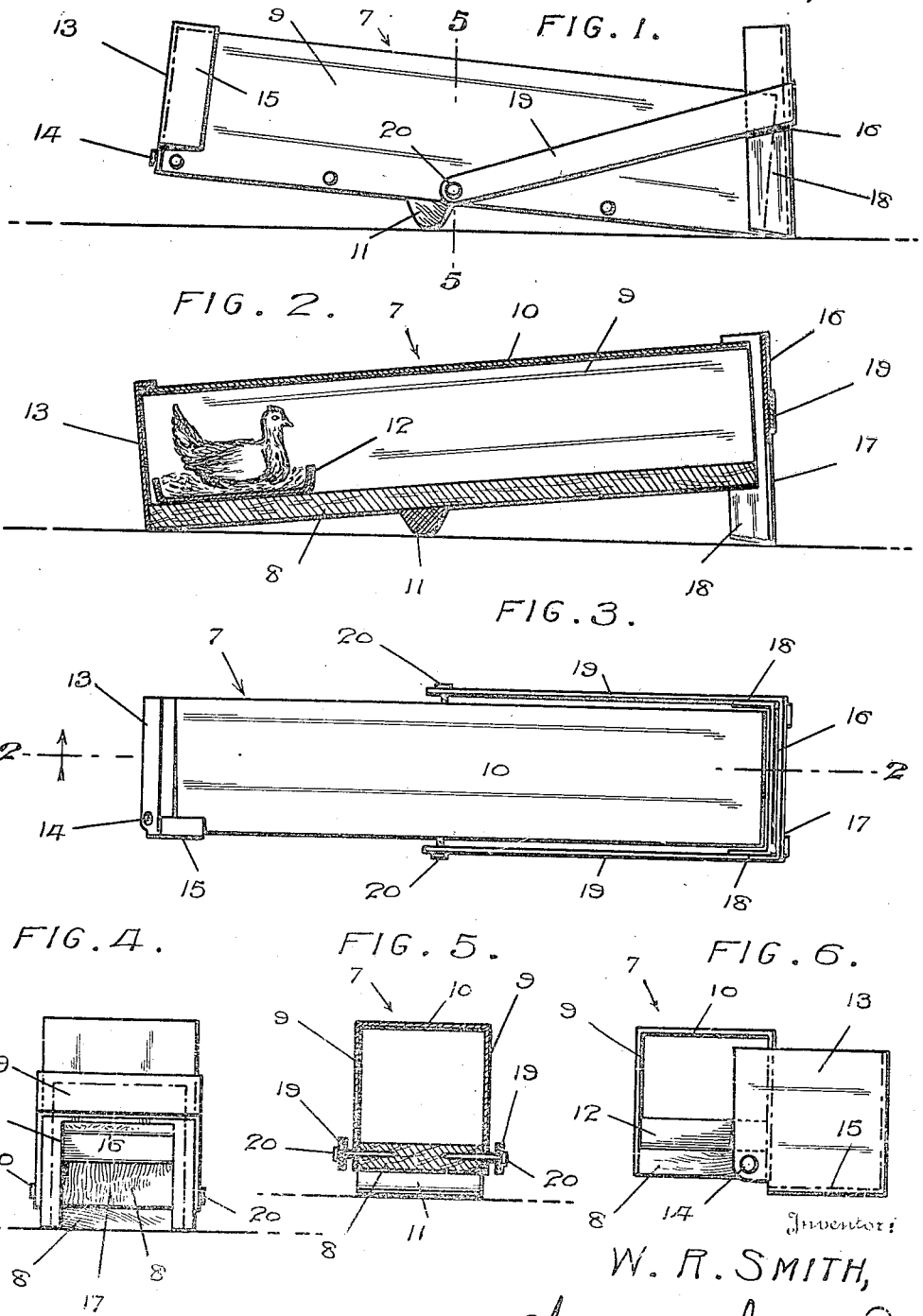

1,435,670

UNITED STATES PATENT OFFICE.

WILLIAM R. SMITH, OF VERDON, NEBRASKA.

HEN NEST.

Application filed May 18, 1922. Serial No. 561,860.

*To all whom it may concern:*

Be it known that I, WILLIAM R. SMITH, a citizen of the United States, residing at Verdon, in the county of Richardson and State of Nebraska, have invented certain new and useful Improvements in Hen Nests; and I do hereby declare the following to be a full, clear, and exact description of the invention, such as will enable others skilled in the art to which it appertains to make and use the same.

The present invention relates to hen nests, and aims to provide a novel and improved construction whereby the hen can occupy the nest in seclusion, without being interfered with or annoyed, and permitting free ingress and egress of the hen to and from the nest.

Another object is the provision of a nest housing having a lower fulcrum in order that the housing can be seated for tilting or teeter movement on the ground, floor or other surface, in combination with means for closing the entrance of said housing when the housing is occupied, and permitting of the entrance and egress of the hen.

It is also an object of the invention to provide such a device which is extremely simple and inexpensive in construction, as well as being practical and serviceable in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved hen nest showing the housing in vacant position.

Fig. 2 is a longitudinal vertical section on the line 2—2 of Fig. 3 showing the housing occupied.

Fig. 3 is a plan view of the device in unoccupied position, as seen in Fig. 1.

Fig. 4 is a front end view with the housing in vacant position.

Fig. 5 is a cross section on the line 5—5 of Fig. 1.

Fig. 6 is a rear end view showing the egg-removing door opened.

In carrying out the invention, there is provided an elongated housing 7 of suitable size, which, as shown, is composed of the wooden bottom 8 and the sides 9 and top 10 formed from a plate of sheet metal, with the lower edges of the sides 9 nailed or otherwise secured to the longitudinal edges of the bottom 8.

Such housing is provided with means for mounting it for tilting or teeter motion on a surface on which the device is seated. Thus, a transverse cleat 11 is secured across the bottom 8 underneath same, and provides a fulcrum to bear on the supporting surface, in order that the housing can tilt on said cleat or fulcrum. Said fulcrum is located nearer the rear end of the housing than the forward end, whereby the forward end portion of the housing is heavier than the rear end portion, causing the housing to tilt or swing forwardly, when unoccupied, with the forward end bearing on the ground or floor, as seen in Fig. 1. A nest receptacle 12 is mounted on the bottom 8 at the rear end of the housing, and when such nest is occupied, as seen in Fig. 2, the weight of the hen in the rear end portion of the housing, will cause the housing to tilt rearwardly to bring the rear end of the housing on the floor or ground, thereby raising the forward end.

Both ends of the housing are open, but the rear end is normally closed by a door 13, pivoted, as at 14, to the rear end of the bottom 8, whereby said door can be swung open to one side, as seen in Fig. 6. The door 13 has a flange 15 at one edge to strike the corresponding side of the housing, when the door is closed. The weight of the door 13 has a tendency to swing the door downwardly, thereby holding the flange 15 against the housing, and supporting said door in place by gravity. This door 13, when opened, gives direct access to the nest proper, for removing eggs therefrom.

In order to close the forward end or entrance of the housing, when the housing is occupied, a guard or shield 16 is disposed in front of the forward end of the casing, and is preferably composed of sheet metal. Said guard has a lower opening 17 with which the forward end of the housing registers when it is in lowered position, in order that the hen can pass through the opening 17 in entering or leaving the housing. The guard 16 has flanges 18 at its side edges bent rearwardly, to stiffen the guard, and to be disposed at the opposite sides of the forward end of the housing, to close the side spaces between the guard and housing. The guard 16 is maintained in position by means of a bail or loop-shaped brace 19 which has its intermediate portion extending across and secured to the guard 16, while the terminals of said bail 19 are pivoted, as at 20, to the housing 7 at the opposite edges of the bottom 8 adjacent to the fulcrum or cleat 11, thereby permitting the bail 19 and housing to swing relatively to one another.

The device can be placed on the floor, ground or other surface, and the fulcrum or cleat 11 bearing on the surface will mount the housing for tilting movement, and the lower end of the guard 16 also bears on said surface. When the housing is vacant, the forward end therefore swings downwardly, in order that a hen can readily pass through the opening 17 into the forward end of the housing, and in passing to the rear end of the housing to the nest proper, the housing is tilted rearwardly, by the depression of the rear end of the housing. This will raise the forward end of the housing, as seen in Fig. 2, and the entrance of the housing will be disposed behind the upper portion of the guard 16, thereby closing said entrance to prevent another hen from entering the housing. The hen within the housing is thus prevented from being annoyed and can remain in the housing in seclusion. When the hen leaves the nest receptacle, and walks forwardly in the housing, to leave same, the weight of the hen in the forward end of the housing will tilt the housing forwardly to normal position, and the forward end of the housing being depressed will permit the hen to pass out through the opening 17. The housing, at the same time, is reset to original position.

Having thus described the invention, what is claimed as new is:—

1. A hen nest comprising a housing having an entrance and a nest portion, and provided with a fulcrum at the bottom between said entrance and portion to be seated on a surface for the tilting movement of the housing, the entrance portion of the housing being heavier than the nest portion so as to swing downwardly by gravity when the housing is unoccupied, and a guard seatable on said surface for obstructing said entrance when the nest portion is depressed when occupied.

2. A hen nest comprising a housing having an entrance at one end and a nest portion at the opposite end, and provided with a fulcrum at the bottom between said ends to seat on a surface for the tilting movement of the housing, the entrance end portion of the housing being heavier than the opposite end portion to swing downwardly by gravity, and a guard connected loosely to the housing to seat on said surface for obstructing said entrance when the entrance end of the housing is raised by the depression of the nest portion when occupied.

3. A hen nest comprising a housing having an entrance and an opposite nest portion, and provided with a fulcrum at the bottom between said entrance and portion to be seated on a surface for supporting the housing for tilting movement, the entrance portion of the housing being heavier than the nest portion to swing downwardly by gravity, a guard to seat on said surface and obstruct the entrance of the housing when the entrance portion is raised by the depression of the nest portion when occupied, and a brace for said guard pivotally connected with the housing to support the guard in position.

4. A hen nest comprising a housing having an entrance at one end and a nest portion at the opposite end, and provided with a fulcrum at the bottom between said ends to be seated on a surface for the tilting movement of said housing, the entrance end portion of the housing being heavier than the nest portion to swing downwardly by gravity when the nest portion is unoccupied, a guard to seat on said surface for obstructing the entrance when the entrance end of the housing is raised by the depression of the nest portion when occupied, said guard having an opening with which said entrance registers when the entrance end of the housing is depressed, and a bail having its terminals pivotally connected with the housing near said fulcrum and having its intermediate portion secured to said guard to support the guard in place.

In testimony whereof I have signed my name to this specification in the presence of two subscribing witnesses.

WILLIAM R. SMITH.

Witnesses:
T. L. HALL,
LEE W. HART, Jr.